Oct. 30, 1962     H. HINTZEN     3,061,329
VEHICLE SUSPENSION
Filed June 30, 1960
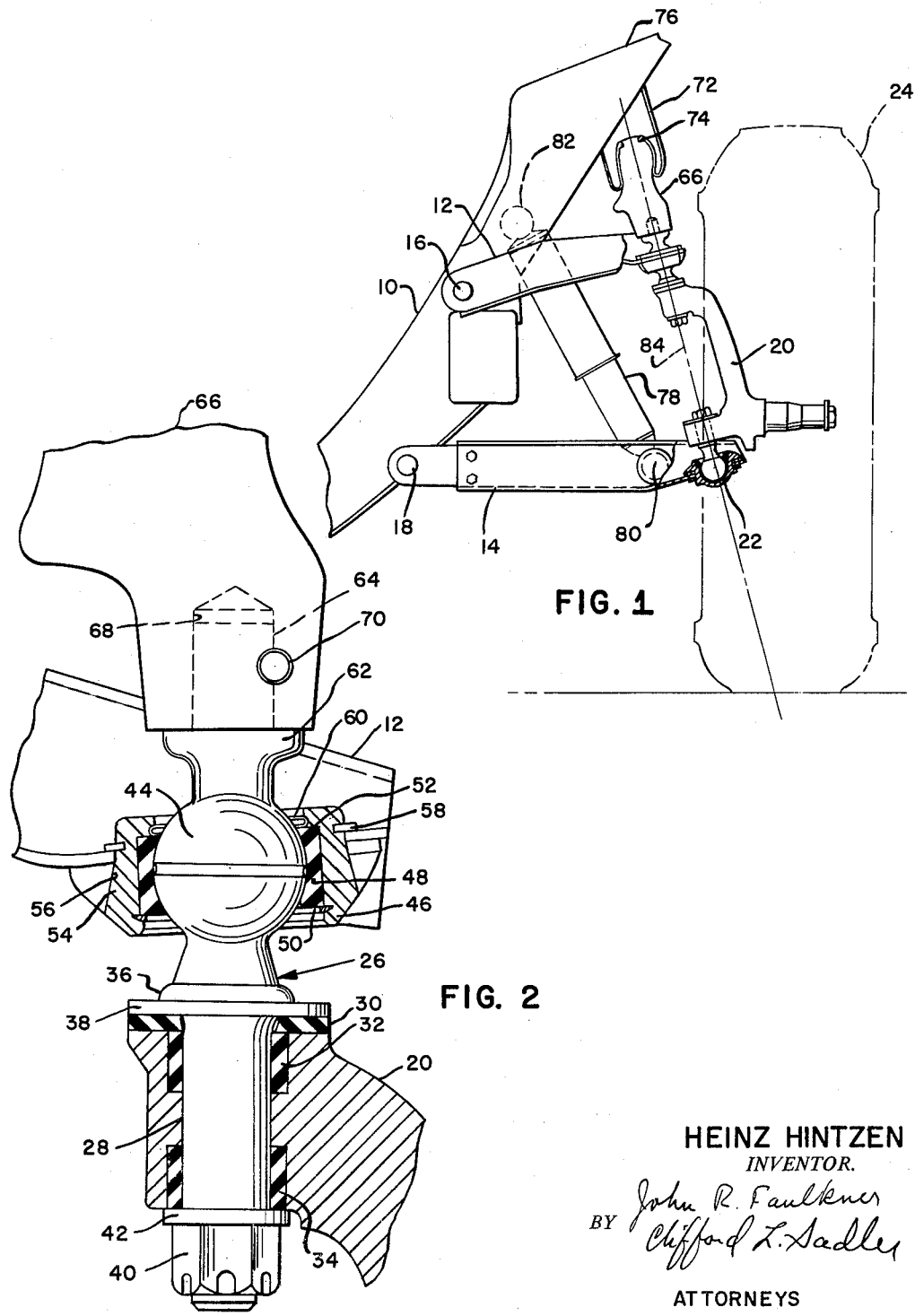
HEINZ HINTZEN
INVENTOR.
BY John R. Faulkner
Clifford L. Sadler
ATTORNEYS

United States Patent Office 3,061,329
Patented Oct. 30, 1962

3,061,329
VEHICLE SUSPENSION
Heinz Hintzen, Grosse Pointe Farms, Mich., assignor to Ford Motor Company, Dearborn, Mich., a corporation of Delaware
Filed June 30, 1960, Ser. No. 40,005
4 Claims. (Cl. 280—96.2)

The present invention relates to vehicle suspension systems and more particularly to means for mounting a suspension spring in an independent front suspension.

It is common practice in the automotive art to provide independent front suspensions for motor vehicles. These suspension systems include upper and lower support arms that are pivotally connected at their inner ends to a vehicle frame member. The outer ends of the arms pivotally support the upper and lower extremities of a wheel carrying spindle member. In structures of this type it has heretofore been common practice to interpose a spring suspension member between either the upper or lower support arm and a frame member. With this type of structure, road loads are transmitted from the wheel carrying spindle through the pivoted connection between the support arm and the spring suspension member. As the load is transmitted through the pivoted connection and the support arm, of necessity, these members must be of very stout construction.

In accordance with the present invention, improved means are provided for directly connecting a suspension spring to the wheel carrying spindle member. In the preferred embodiment, the support arms may be of lighter construction than with earlier types and further, the pivoted connection of the arms to the spindle may also be of lighter weight.

More specifically, this invention provides ball type joints at the upper and lower ends of the spindle member that are connected with the upper and lower support arms respectively. Further, the invention comprehends a pedestal-like extension on the spindle portion of the upper ball joint which is connected to the suspension spring. The spring is interposed between the extension and a frame member.

The ball of the upper joint does not carry any wheel loads. It attaches the spindle to the arm and permits the wheel to turn and move up and down.

These and further objects and advantages of the present invention will be fully comprehended from the following description and the accompanying drawings in which:

FIGURE 1 is a front elevational view of an independent front suspension incorporating the present invention, and FIGURE 2 is an enlarged view partly in section of the construction of the spindle member and the upper support arm.

Referring now to the drawings, an independent front suspension system is shown in FIGURE 1 incorporating the preferred embodiment of the present invention.

A vehicle frame 10 extending transversely of the vehicle's axis pivotally carries an upper support arm 12 and a lower support arm 14 by hinged-type connections 16 and 18 located at the inner ends of the arms 12, 14. The outer end of the lower support arm 14 is joined to the lower end of a spindle 20 by a ball type joint 22. The spindle member 20 rotatably carries a pneumatic tire and wheel assembly 24.

A ball joint connection is also provided between the upper end of the spindle member 20 and the outer end of the upper arm 12. As seen in FIGURE 2, this joint includes a ball carrying shaft member 26 having a lower shank portion 28 journalled in the upper end of the spindle 20. Bearing members 30 and 32 permit relative movement between the shank 28 and spindle 20. A second bearing 34 rotatably receives the lower end of the shank 28. A shoulder 36 is provided at the upper end of the shaft portion 28 and a washer 38 is interposed between it and bearing member 30. The lower end of the shank 28 terminates with a threaded portion. A nut 40 in combination with a washer 42 secures the bottom half of the shaft 26 to the spindle 20.

A ball 44 is centrally formed on the shaft 26 and is seated in a socket assembly carried by the outer end of the upper arm 12. The socket assembly includes a socket housing 46 in which a socket liner 48 is seated. A snap ring 50 cooperating with a shoulder 52 positions the liner piece 48 within the socket housing 46. The housing 46 has a tapered or frusto-conical exterior surface 54 that fits within a conical bore 56 formed in the arm 12. This tapered connection of the bore 56 and housing 46 in cooperation with a snap ring 58 retains the housing in position. A seal 60 may be provided for the upper surface of the ball 44.

A portion of the shaft 26 extends above the ball 44 and is provided with a collar 62 and an upper shank portion 64. An irregular shaped pedestal 66 is bored out at 68 to receive the shank 64 and rests its lower end upon the collar 62. A transverse pin 70 passes through the end of the pedestal 66 and locks it into position relative to the shank 64. The pedestal 66 forms the lower part of the spring suspension and has a diaphragm rubber piece 72 which is sealed at 74 to its upper end. Diaphragm 72 forms the air bag of an air type suspension system. It is sealed and seated at the upper end 76 of the frame member 10. The compression and expansion of the air trapped within the diaphragm or bag 72 constitutes the elastic portion of the suspension spring.

The independent front suspension system is completed by a telescopic type direct acting shock absorber 78 that is pivotally connected at 80 near the outer end of the lower support arm 14. The other end 82 of the shock absorber is pivotally connected to the frame 10.

A line 84 intersecting the center of the ball 44 and the joint 22 forms the axis about which the spindle 20 is rotated for steering purposes.

In operation, when a vehicle having the suspension of FIGURE 1 is driven and the wheels 24 strike an obstacle, the spindle 20 will be driven upwardly. The loads and forces associated with that action will be transmitted directly through the shaft member 26 to the pedestal 66 and from there will be cushioned by the air within the diaphragm 72. These loads will not be transmitted through the upper and lower arms.

The foregoing description constitutes the preferred embodiment of the present invention; however, modifications may occur to those skilled in the art which will come within the definition of applicant's invention as contained in the appended claims.

What is claimed is:
1. In an independent suspension system having upper and lower arms, a steerable wheel supporting spindle universally connected to said upper and lower arms, a ball and socket type joint connecting said spindle with one of said arms, the ball member of said joint having an extending portion forming a support for an air spring suspension member.

2. An independent suspension system having upper and lower support arms and a wheel supporting spindle, a ball and socket type joint connecting said spindle with said upper arm, said joint having ball and socket members, said ball member having an extension forming a pedestal support for an air type suspension spring, and said ball member having a second extension rotatably received in said spindle.

3. An independent suspension system having a pivotable upper arm and a steerable wheel spindle, said upper arm having a socket, a ball member fitted in said socket, said ball member having a portion extending upwardly, said portion forming a support for a suspension spring, said ball member having a portion rotatably connected to said spindle.

4. In an independent suspension system having a pivotal arm, a steerable wheel supporting spindle, a ball and socket type joint connecting said spindle with said arm, the ball member of said joint having an extending portion forming a support for a spring suspension member, and said ball member rotatably engaging said spindle.

References Cited in the file of this patent

UNITED STATES PATENTS

| | | |
|---|---|---|
| 2,290,923 | Wahlberg | July 28, 1942 |
| 2,756,067 | Porsche et al. | July 24, 1956 |
| 2,871,025 | Neher | Jan. 27, 1959 |
| 2,904,343 | Taber | Sept. 15, 1959 |
| 3,007,728 | Hoffman | Nov. 7, 1961 |